United States Patent
Turkewitz et al.

(10) Patent No.: US 6,814,021 B1
(45) Date of Patent: Nov. 9, 2004

(54) BIRD REPELLER AND ASSEMBLY METHOD

(76) Inventors: Robert M Turkewitz, 720 Wildwood Rd., Charleston, SC (US) 29412; Arthur F Doty, III, 7789 Russell Creek Rd., Edisto Island, SC (US) 29438; Ernest G Byers, 918 W. Oceanview Rd., Charlston, SC (US) 29412

( * ) Notice: Subject to any disclaimer, the term of this patent is extended or adjusted under 35 U.S.C. 154(b) by 0 days.

(21) Appl. No.: 10/414,258

(22) Filed: Apr. 15, 2003

Related U.S. Application Data (63) Continuation-in-part of application No. 09/893,967, filed on Jun. 29, 2001, now Pat. No. 6,557,482.

(51) Int. Cl.$^7$ ................................................. G08B 9/00
(52) U.S. Cl. .................... 116/22 A; 116/22 R; 116/150; 446/217
(58) Field of Search ............................. 116/22 A, 22 R, 116/67 R, 202, 280, 147, 150, 200; 446/213, 216, 217, 218, 176, 485, 236, 242

(56) References Cited

U.S. PATENT DOCUMENTS

| | | |
|---|---|---|
| 333,611 A | 1/1886 | Daveggio |
| 697,072 A | 4/1902 | Davis |
| 733,778 A | 7/1903 | Weber |
| 966,950 A | 8/1910 | Puha |
| 2,788,762 A | 4/1957 | Wright |
| 3,070,919 A | 1/1963 | Peckham |
| 3,292,319 A | 12/1966 | McCarthy |
| 3,374,763 A | 3/1968 | Browning |
| D221,453 S * | 8/1971 | Swanberg .................. D21/444 |
| 3,786,583 A | 1/1974 | Revor |
| 4,074,653 A | 2/1978 | Pember |
| 4,138,673 A | 2/1979 | Faust |
| 4,573,427 A | 3/1986 | Konzak |
| 4,649,853 A | 3/1987 | Powell |
| 4,656,770 A | 4/1987 | Nuttle |
| 4,693,162 A * | 9/1987 | Lee .............................. 84/404 |
| 4,847,590 A | 7/1989 | Gosswiller |
| 4,884,328 A * | 12/1989 | Neighbors ................... 446/217 |
| 4,896,305 A * | 1/1990 | Gimbal ...................... 116/22 A |
| 5,148,621 A | 9/1992 | Rosen |
| 5,196,961 A | 3/1993 | Sun |
| 5,241,777 A | 9/1993 | Looker et al. |
| 5,267,525 A | 12/1993 | Person et al. |
| 5,341,759 A | 8/1994 | Hood |
| 5,343,651 A | 9/1994 | Chatten |
| 5,353,543 A | 10/1994 | Teraoka |
| 5,368,515 A | 11/1994 | Mast |
| 5,425,192 A * | 6/1995 | Negre ....................... 116/22 A |
| D365,295 S * | 12/1995 | Kandampully ............. D11/117 |
| 6,285,630 B1 * | 9/2001 | Jan ........................... 116/22 A |
| 6,351,908 B1 | 3/2002 | Thomas |
| 6,385,915 B1 | 5/2002 | Keeler |
| 6,398,614 B1 | 6/2002 | Wu et al. |
| D464,587 S * | 10/2002 | Ursprung ................... D11/165 |
| D464,588 S * | 10/2002 | Ursprung ................... D11/165 |
| D464,589 S * | 10/2002 | Ursprung ................... D11/165 |
| D464,911 S * | 10/2002 | Ursprung ................... D11/165 |
| D465,174 S * | 11/2002 | Ursprung ................... D11/165 |
| 6,557,482 B1 | 5/2003 | Doty, III et al. |
| 6,570,494 B1 * | 5/2003 | Leftridge, Sr. ............ 116/22 A |

* cited by examiner

*Primary Examiner*—Diego Gutierrez
*Assistant Examiner*—Travis Reis
(74) *Attorney, Agent, or Firm*—Nexsen Pruet Adams Kleemeier, LLC; Townsend M Belser, Jr.

(57) ABSTRACT

A method of making an assembly for repelling birds from a selected area, including forming fins and vents on a rotor and rotatably mounting the rotor on the distal end of a support member, the proximate end of which is adjusted to be fixed within the selected area. The fins and vents on the rotor are responsive to wind currents to rotate the rotor and generate bird repelling noises and visual effects. The fins may include light reflective and/or other design indicia to enhance the visual effects. An electrical sound producing device may be mounted on the rotor for emitting the sound of a bird predator.

26 Claims, 5 Drawing Sheets

BIRD REPELLER AND ASSEMBLY METHOD

RELATED APPLICATIONS

This application is a continuation-in-part of U.S. application Ser. No. 09/893,967 filed Jun. 29, 2001, now U.S. Pat. No. 6,557,482, the entire contents of which is incorporated herein by reference.

TECHNICAL FIELD

The present invention relates to devices for discouraging the entry of birds into spaces where their presence is undesirable, and more particularly, to a rotating device for scaring birds away from an area in which their presence is undesirable and to methods of making this device.

BACKGROUND OF THE INVENTION

In coastal regions of the United States and other countries, marine craft, docks, aids to navigation and other marine structures suffer considerable damage and soilage from the droppings of sea gulls, tems, pelicans, cormorants and other birds. Similarly, communities near garbage dumps and land fills, which often attract large numbers of birds, may sustain similar soilage and damages, such as "white washed" rooftops.

Many devices, such as flags, plastic owls, snakes and other animals, noisemakers, deck sweepers and the like, have been tried in the past to deter birds from alighting on such structures. These prior art devices have had only limited success, at least in part because birds seem to become adapted to the presence of the device and then to ignore it.

SUMMARY OF THE INVENTION

A bird repeller made in accordance with the present invention repels birds through a combination of sound, vibration and/or visual effects, which annoy the birds enough to prevent them from landing within 10–15 feet of the repeller. Furthermore, the almost constant variations in these effects prevent the birds from getting so use to the repeller that they come to ignore it over a period of time. Prototype testing suggests th at one repeller would be effective to keep free of bird droppings an area of 300 square feet or more, and that, over an extended period of time, birds will stay as far away from the repller as they did on the first day of installation. It is believed that birds do not get accustomed to the sound, vibration and visual effects of the device because these effects are constantly changing with the rotational speed of the rotor member, which varies with the changes in the driving wind velocity.

The bird repeller comprises a revolving hollow rotor that has laterally projecting fins adjacent to vents in a barrel section of the rotor. The barrel section has a chamber surrounded by a wall made of a cuttable and deformable material. The fins ar e shaped by the way in which they are cut out of the barrel section, and then they are pivoted radially outward around a hinge portion and arranged to catch even the slightest breeze to create a wind turbine effect that spins the rotor on a vertical axis. As air currents of the wind pass across the fins and through the vents, they create a whirring sound that varies with the slightest change in the wind velocity. In addition to the whirring sound, a drum section of the rotor connects the barrel section to a neck of the rotor that rubs and beats against a vertical pole on which a head section of the rotor is rotatably mounted. This rubbing and beating causes the rotor to vibrate and generates a clacking noise having a constantly changing rhythm or reverberation cycle. Optionally, bells, clappers or other shakable noisemakers may be attached to an intermediate section of the pole, which also vibrates and shakes in response to the rubbing and beating action of the rotor neck against the pole. The resulting noise and vibratory sounds also change constantly with the velocity of the wind. Another option is to mount an electrical, solar powered sound device on the rotor body to provide the sound of a bird of prey or other bird predator.

In addition, the movement of the large projecting fins in the light of daytime is believed to cause a visual disturbance to the birds. This visual disturbance may be enhanced by the addition of holographic eyes or other designs on the fins, the designs being located preferably on the side of the fins in the direction of their rotation. The fin designs may also include a sparkling material capable of reflecting light in a flashing manner as the rotor rotates. The combination of the whirring and vibratory sounds with the visual effects of the spinning fins has the consequence of making birds sufficiently uneasy that they give a wide berth to the repeller.

Another advantage to the repeller of the invention is the simplicity of its construction and method of manufacture. The rotor, which is preferably made of plastic, is mounted on a cap adhered to the top of a head portion of the vertical mounting pole and is secured to the head cap by a stainless steel screw via a nylon spacer that serves as a rotor bearing. This rotary mounting connection allows the rotor to rotate freely around the head portion of the pole. A proximate end portion of the mounting pole is held stationery by securely fastening it to any support structure, such as by clamped metal bands, bolts, or by simply slipping the base of the pole into a fishing rod holder on a boat, dock or other support structure.

By way of example, the rotor may be fashioned from a large inverted plastic juice bottle by cutting through a barrel section of the bottle material along a cut line for forming three free edges of each fin and then bending the fin radially outward along the remaining proximate edge of the fin that forms a deformable hinge by which the fin remains attached to the barrel section at the angle to which it is bent. A vent corresponding to each fin is formed when the cutout for the fin is bent outward. The bottle from which the rotor may be made preferably has an upper tapered portion leading to the bottle neck, and this tapered portion forms an acoustic section of the rotor that enhances the vibratory sounds caused by the neck rubbing against the pole. In other words, the wall of the acoustic section resonates in response to vibrations caused by the rubbing action between the rotor neck and the pole.

The number and size of the fins and vents may vary widely, although 4 to 8 fins and vents are preferred, more preferably 6 or less for the rotor size described below. Although rectangular and oval-like fins and vents are shown in the drawings by way of example, these elements may have other shapes and the fins and vents on the same rotor may have different sizes and shapes. A preferred rotor size is between 8 and 12 inches long and between 4 and 6 inches in diameter at the barrel so that the rotor is compact and can be easily stored in a small space, such as a storage cabinet on a boat, when it is not deployed in its active position on the mounting pole. The neck opening, which slips over the mounting pole, is preferably between about 1.25 and about 1.5 inches in diameter where the adjacent diameter of the mounting pole is about 1 inch. This gives a clearance of about 0.125 to about 0.25 inch between the neck and opposite sides of the mounting pole, which provides a preferred frequency of bird repelling vibrations. Where the overall length of the rotor is about 12 inches, the preferred lengths of the head, barrel, acoustic section and neck are respectively about 0.5 inch, about 6.5 inches, about 3.75 inches and about 1.25 inches. For a barrel of about 6.5 inches long and about 5.0 inches in diameter, the fins and vents are preferably about 2.75 inches long and about 1.75 inches wide, and the optimum number of fins and vents is 6.

Although the preferred material of the rotor is plastic, other materials may be used, such as steel, aluminum and other metals. Instead of nylon, the bearing washer may be made of Teflon or stainless steel. The mounting pole may be made of hollow or solid plastic, wood or metal. The plastic may be PVC, the wood may be pine or oak, and the metal may be steel or aluminum.

The need for a bearing washer may be avoided by the rotary mounting structure employed in a second embodiment of the invention. In this embodiment, a lag-bolt type structure passes through and is secured to the head section of the rotor, with the shaft of the bolt projecting into the rotor along its rotational axis. The distal end of the bolt shaft rests freely in and rotates within a socket formed by a small metal or plastic cup that is mounted on the cap secured to the head of the vertical mounting pole. This second embodiment of the invention may have greater rotational wobble than the first embodiment, and thereby may produce a more effective vibratory sound by the rubbing action between the neck of the rotor and the mounting pole. The rotary connection may also have a longer wear life than the mounting screw and washer bearing of the first embodiment. However, the first embodiment may be mounted either upright, as shown in the drawings, or upside down with the proximate end of the mounting pole secured to an overhead mounting structure, whereas the second embodiment can only be mounted in an upright position.

A third embodiment illustrates a method of making all of the embodiments, and emphasizes a fin structure that is lighter than the two embodiments described above.

The above features and benefits and the proven effectiveness of a prototype, combined with simplicity and low cost of making the device, make the bird repeller of the present invention significantly superior to any previously known repeller of the prior art.

BRIEF DESCRIPTION OF THE DRAWINGS

The invention, both as to its structure and operation, may be further understood by reference to the detailed description below, taken in conjunction with the accompanying drawings in which:

FIG. 8 is partial cross-sectional view in elevation of an optional modification of the third embodiment of the invention; and, FIG. 9 is partial cross-sectional plan view taken along lines 9—9 of FIG. 8.

DETAILED DESCRIPTION OF PREFERRED EMBODIMENTS

Figure 1:
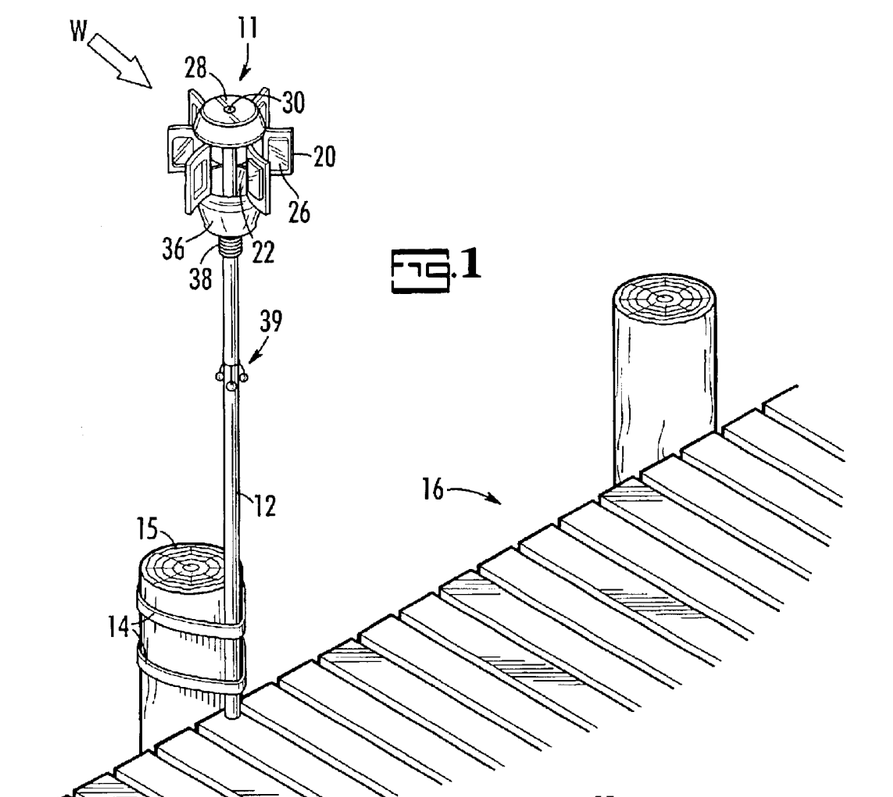
FIG. 1 is a prospective view illustrating installation of the invention on a dock to repel sea birds.

Referring to FIG. 1, there is shown a bird repeller assembly, generally designated 10, comprising a body 11, rotationally mounted on a pole or standard 12 secured by a pair of metal or plastic bands 14, 14 to the piling 15 of a dock 16. As may be seen best in FIGS. 2-4, body 11 comprises a barrel section 18 having a plurality of fins 20 each adjacent to a corresponding vent opening 22.

Figure 2:
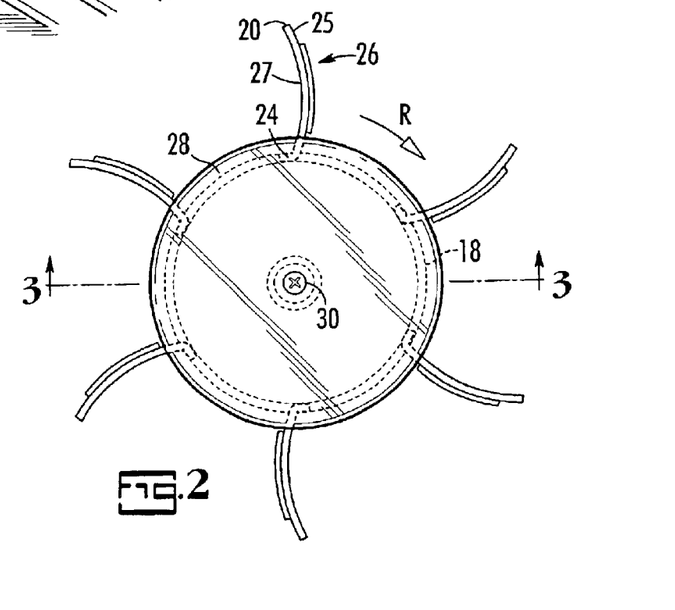
FIG. 2 is a plan view of the invention of FIG. 1.
Figures 3, 4:
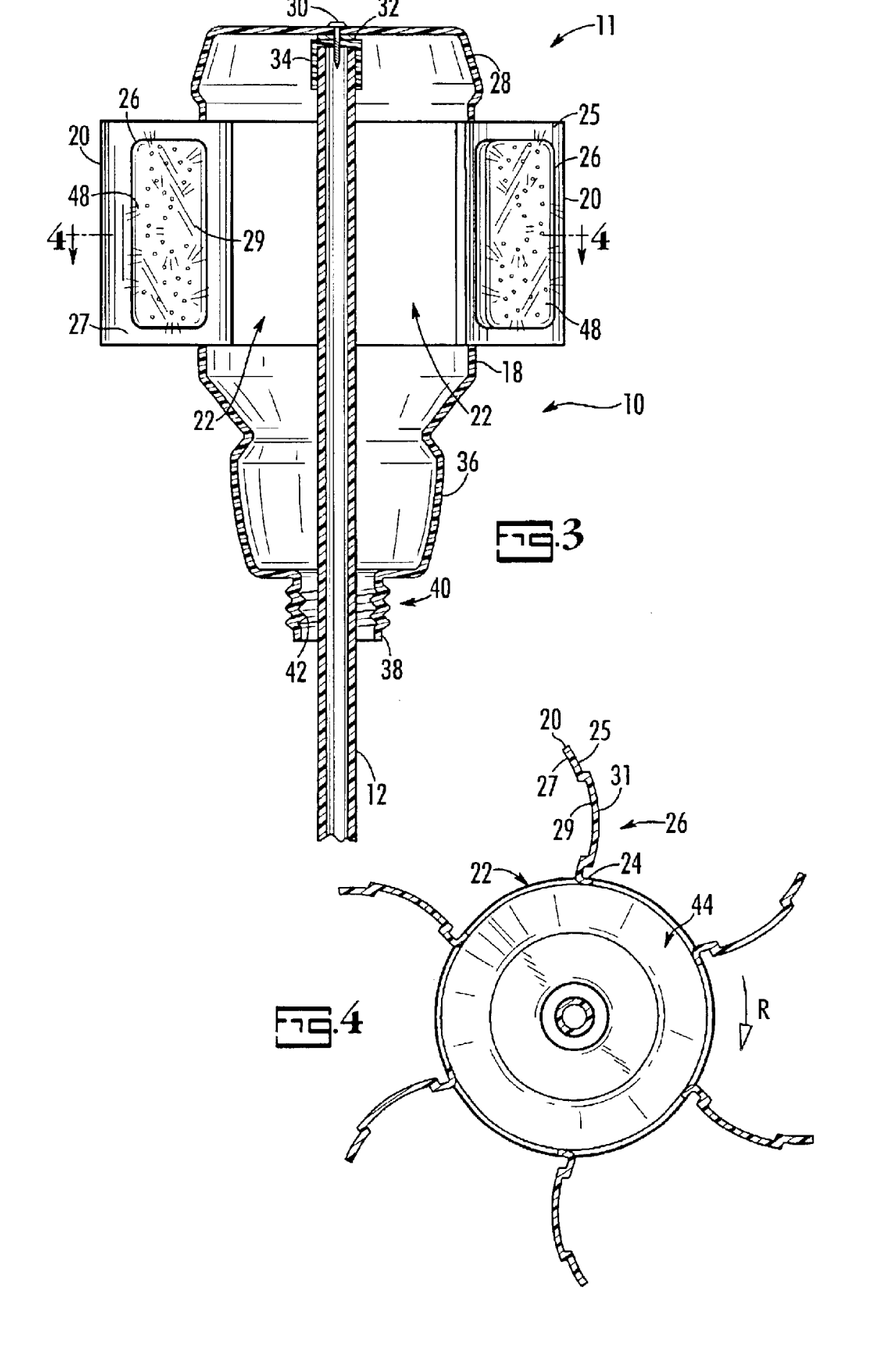
FIG. 3 is a fragmentary cross-sectional view of the invention in elevation taken along lines 3—3 of FIG. 2.
FIG. 4 is a cross-sectional view taken along lines 4—4 of FIG. 3.

Each fin 20 is attached to the barrel 18 by an elongated hinge segment 24 and preferably has a pressed out cup-like portion or indent 26 for enhancing the catching of a wind current or other air flow produced by the prevailing wind as represented by arrow W. The vents 22 are preferably formed by stamping or otherwise cutting out the fins 20 from the wall of barrel 18. The wind provides an airflow over the fins 20 which causes the body 11 to rotate in the adirection of arrow R (FIG. 2) due to the concave curvature of the fin surface 27, and the convex curvature of the fin surface 25. This rotation is enhanced by the cupping action of the fin indent 26, which projects from the convex fin surface 25 in the rotational direction R and has a concave surface 29 and a convex surface 31 (FIG. 4).

A head section 28 above barrel 18 is rotatably secured to the top or distal end of pole 12 by a screw 30 that passes through a bearing washer 32 and is threaded into a cap 34 adhered to the distal end of the pole. Below the barrel 18 is an acoustic section 36 formed integrally with a neck 38 having accordion-like convolutions 40. The inner surface of the convolutions 40 form ridges 42 that rub and beat against the pole 12 as the rotor body 11 rotates relative thereto. This rubbing and beating action causes vibratory noise and clacking reverberations that are amplified by the acoustic section 36. As an optional feature, one or more shakable noisemakers, such as a plurality of bells 39, may be attached to the pole 12, which vibrates and thereby shakes the noisemakers to produce additional bird repelling noise in response to the rubbing action of the rotor neck against the pole.

The wind currents, which produce rotation of the rotor by impacting against the fins, also pass over the fins and through the vents 22 thereby generating a whirring noise. In other words, wind currents pass through the upwind vent openings oriented toward the wind arrow W and into the inner chamber 44 of the rotor 11, and then pass out of the chamber 44 through the downwind vent openings oriented away from the wind arrow W. This wind current air flow, in combination with rotation of the repeller body 11, is believed to be the source of the whirring noise observed during prototype testing. In addition, the rubbing and beating action of the neck against the pole generates a clacking noise having a constantly changing rhythm or reverberation cycle.

Figure 5:
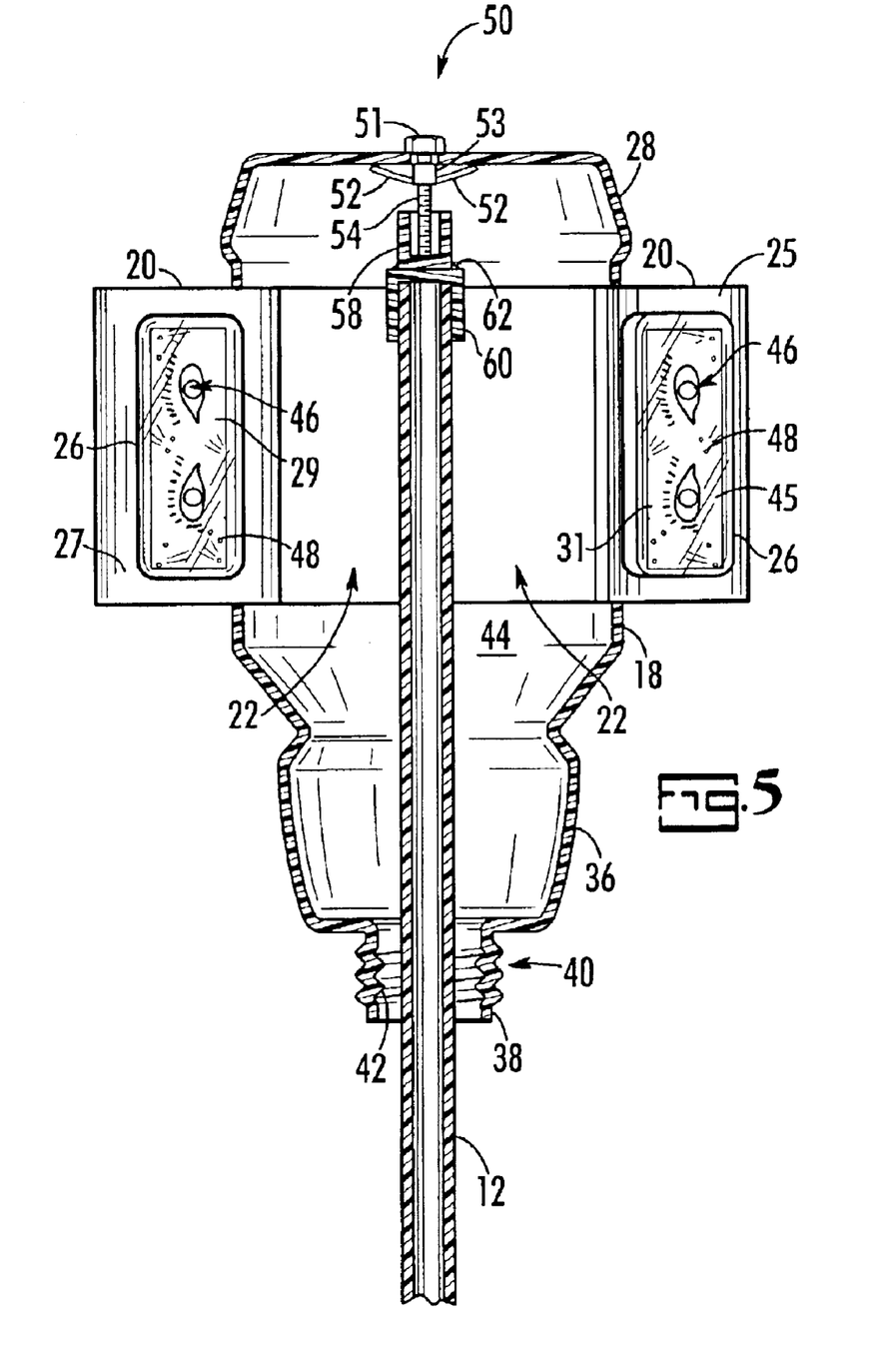
FIG. 5 is a fragmentary cross-sectional view in elevation of another embodiment of the invention.

Referring now to FIG. 5, there is shown a second embodiment of the invention wherein the same numeral part designations have been used to indicate structural elements identical with those shown in FIGS. 1-4. In the modified or second embodiment shown in FIG. 5, the rotary connection between the rotor body 11 and the top of the pole 12 is significantly different from that shown in FIG. 3.

In the second embodiment, a lag-bolt, generally designated 50, has a head 51 engaging the outer surface of head section 28, and a threaded shaft 54 that passes through the head section 28 and is secured thereto by a pair of anchor arms 52-52. The lag-bolt 50 is of conventional design wherein the arms 52-52 are initially folded so as to pass through an aperture 53 in the center of the head section 28, and then the arms 52-52 are expanded against the underside of the head section 28, as shown in FIG. 5, by rotation of the lag-bolt shaft 54 in response to rotation of its head 51 by a screwdriver, wrench or other conventional tool. After the lag-bolt is secured in the position shown, the neck 40 of the rotor is slipped over the top of the mounting pole and the rotor is lowered until the distal end of the bolt shaft 54 rests within and against the bottom of a cup 58 secured to a pole cap 60, such as by an adhesive 62 where the pole cap 60 is made of plastic, or by soldering or welding where the pole cap 60 is made of metal. As an alternative, the cup 58 and the pole cap 60 may be made of the same material and formed as a single-piece, integral structure.

When assembled as shown in FIG. 5, the distal end of lag-bolt shaft 24 rests on the bottom of cup 58 and the shaft rotates within the cup 58 and supports the rotor body 11 for rotation in response to the wind. The fins, vents, neck and remaining structure of the second embodiment function in the same manner as those of the first embodiment as described above. However, since the distal end of shaft 54 rests freely within the cup 58, the second embodiment may be operated only in an upright position such as that shown in FIG. 5, whereas the first embodiment may be operated either in an upright position, such as shown in FIG. 1, or in an inverted position, such as where the opposite or proximate end of pole 12 is secured to an overhead structure, e.g., a roof beam of a dock shelter, porch roof or the like.

The bird disturbing visual effects provided by the spinning fins may be enhanced by placing designs, such as the holographic eyes 46 shown in FIG. 5, on one or both sides of one or more of the fins. The designs may include a light reflective material, such as sparkling particles 48, that reflect light in a flashing manner during rotation of the rotor in the presence of light. The reflective material also may be used without a design, as shown in FIG. 2, on one or both sides of one or more of the fins.

Example of an Assembly Method

Figure 6:
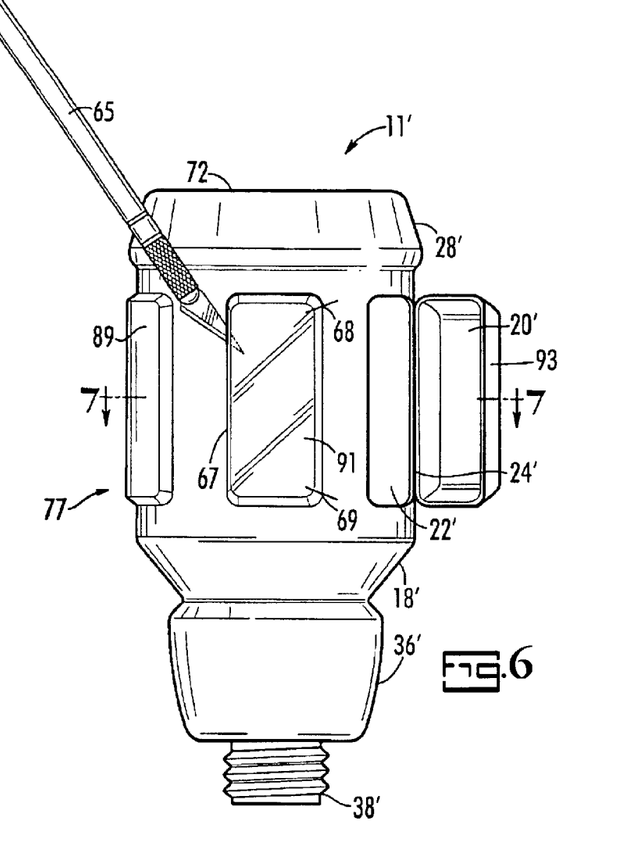
FIG. 6 is an elevational view illustrating a method of making the repeller body of a third embodiment of the invention.
Figure 7:
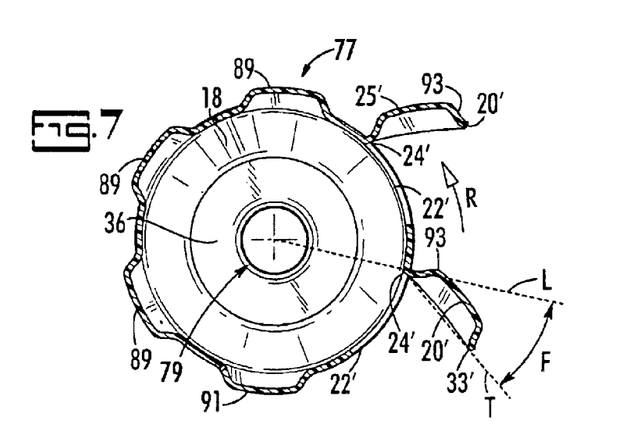
FIG. 7 is a cross-sectional view of the repeller body taken along lines 7—7 of FIG. 6.
Figures 8, 9:
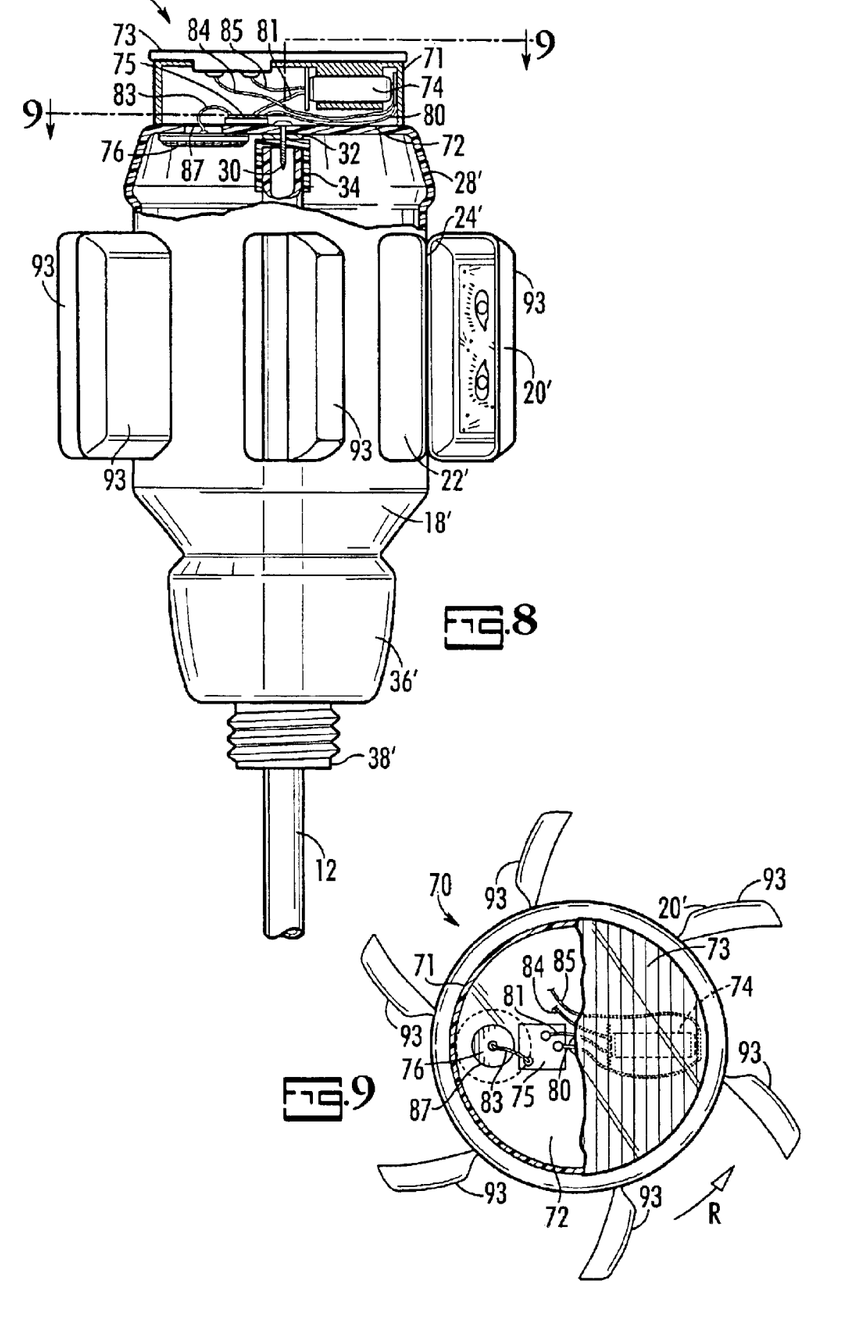

As shown in FIGS. 6-8, another embodiment of the bird repeller in the invention may be made from a one-half gallon round plastic container or bottle having a body 11' with six (6) cup-like protrusions or bosses 77 projecting radially outward from its side, these projecting bosses or cup-like portions having been formed as an integral part of the body 11' by molding, stamping, pressing out or the like. The body 11' also includes a barrel section 18', an acoustic section 36', a neck section 38', and a neck mouth opening 79 which is approximately 1 ¼ inch in diameter. The following additional supplies may be used in making this embodiment of the bird repeller: a #10, ¾ inch stainless steel Phillips head screw 30; a washer 32 having an aperture for receiving screw 30; a section of ¾ inch PVC pipe 12 preferably at least three feet in length; a PVC rounded end cap 34 for the ¾ inch PVC pipe 12; and decal stickers 45 depicting eyes 46 and glitter 48. The following tools may be used to assemble the foregoing supplies: a sharp knife 65, a drill (not shown), 3/16 inch and 7/64 inch drill bits (not shown), and a Phillips head screw driver (not shown). The embodiment of FIGS. 6-8 may then be made in accordance with the following steps:

1. Using the sharp knife 65, cut shapes corresponding to the desired fins 20' out of the bosses 77 at six (6) substantially equally spaced positions around the side wall of the container body 11' by cutting along a cut line 67 that represents the base where the boss 77 transitions into the cylindrical wall of the barrel 18' (this differs from the embodiments of FIGS. 1-5, wherein the fin 20 includes a small portion of the cylindrical barrel wall, and produces a lighter weight fin 20'). Before cutting, make marks 68 and 69 on the barrel wall and cut along line 67 from mark 68 to mark 69, leaving the fin 20' attached to the barrel 18' by a deformable hinge portion 24'. In FIG. 7, boss 89 is uncut, boss 91 is being cut by knife 65, and boss 93 has been cut to form a shape corresponding to that of fin 20'. Then, bend each fin outward until it extends from the wall of barrel 18' so that a tangent T to the hinge portion and to the distal inner edge of the fin makes an angle F in the range of about 20' to about 90°, preferably about 30° to about 60°, more preferably about 40° to about 50°, most preferably about 45°, relative to a radial line L from the spin axis represented by the axis of screw 30 as shown in FIG. 7. The tangent T touches the innermost surface of the hinge portion 24' and the outermost inner edge of the fin at its distal end 33'.
2. Drill a hole in the top center of the bottom 72 of the bottle using the 3/16 inch drill bit.
3. Drill a hole in the top center of the PVC cap 34 using the 7/64 inch drill bit.
4. Insert a top portion of the ¾ inch PVC pole 12 through the mouth opening 79 of the bottle neck 38' and push the top portion of the pole through one of the fin openings 22'.
5. Push the PVC cap 34 onto the projecting top end of the ¾ inch PVC pole 12 using hand pressure until it is tightly secured by a friction fit or by a PVC adhesive.
6. Retract the top portion of the pole back into the bottle and align the PVC cap hole with the hole in the bottom 72 of the bottle.
7. Secure the bottom 72 to the cap 34 with the #10, ¾ inch stainless steel Phillips head screw 30 passing through the aperture of washer 32, being careful not to over tighten and making sure that each fin 20' extends substantially along the tangent T as described in step 1.
8. Test the resulting bird repeller body 11' by spinning it, and adjust the screw 30 as needed to make sure the body 11' spins freely.
9. Optionally, stickers 45 with eyes 46 and/or glitter 48 may be secured to one or both sides of the fins 20' on the body 11'.
10. A number of different methods may be used to attach the bottom of the pole to a dock piling 15 or other fixed structure so that the pole is fixed in a substantially vertical position. The attaching methods include the straps 14 shown in FIG. 1, or alternatively by first attaching to piling 15 with straps 14, or with screws and/or nails, a section of 1 inch PVC pipe that will accept the bottom of the ¾ inch pole, in the same manner that a fishing rod holder supports the rod on a boat.

Referring now to FIGS. 8 and 9, on the exterior surface of the bottom wall of the inverted bottle, which is the top wall 72 of the head section 28' of the repeller body 11', there may optionally be mounted a housing 71 enclosing from the weather a noise device that mimics the sound of a bird of prey or other predator. This noise device may comprise a solar cell 73, a rechargeable battery 74, a sound chip 75, and a speaker 76 that emits the sound of the predator to scare birds away form the area to be protected. Solar cell 73 is electrically connected to battery 74 by wires 84 and 85, battery 74 is electrically connected to chip 75 by wires 80 and 81, and chip 75 is electrically connected to speaker 76 by a wire 83. Wire 83 passes through an aperture 87 in the top wall 72 because the speaker 76 is preferably mounted within the hollow chamber of body 11' so that the sound emitted by the speaker passes freely (loudly and clearly) through the vents 22'.

While specific bird repeller assemblies and methods for their manufacture have been described and illustrated in detail, it will be apparent to those skilled in the art that many modifications and variations are possible without deviating from the broad scope of the present invention. For example, other types of rotary connections may be used to mount the head of the rotor on the distal end of the pole. In addition, the rotor and the pole may be made of a variety of materials, and the neck, acoustic section, barrel, head section, fins and vents may have a wide variety of shapes and sizes. Thus, the specific embodiment described herein is for the purpose of illustrating the present invention, and persons skilled in the art will recognize variations thereof that fall within the scope of this invention, which is limited only by the claims appended hereto, and the equivalence of the features described therein.

What is claimed is:

1. A method of making a repeller assembly for repelling birds from a selected area, said method comprising steps of:
   selecting a hollow rotor body comprising a barrel section connected to a neck section having a mouth opening, said barrel section having a chamber surrounded by a sidewall of cuttable and deformable material;
   cutting said sidewall along cut lines to form at least two fin shapes each connected to said barrel section by a hinge portion;
   pivoting said fin shapes radially outward from a rotational axis of said rotor body to deform said hinge portions and form at least two vent apertures in said rotor body and at least two fins each projecting outward from said rotor body and extending radially from said rotational axis;
   selecting an elongated support member having a distal end portion and a proximate end portion adapted to be fixed within the selected area;
   inserting said distal end portion of the support member into said barrel section through said mouth opening and said neck section, said mouth opening and said distal end portion being sized to provide a clearance between an internal surface of the opening and an external surface of said distal end portion; and,
   rotatably mounting said rotor body on said distal end portion of the support member, said mounting and said neck opening being arranged so that air flowing against said fins and through said vent apertures rotates said rotor body with a wobble producing a rubbing action between the rotor neck and the support member that generates a sound for repelling birds from the selected area.

2. A method according to claim 1 wherein said hinge portions are deformed to position each of said fins such that an imaginary line tangent to an innermost surface of said hinge portion and to an outermost edge at a distal end of said fin is at an angle in the range of about 20° to about 90° relative to a radial of said rotational axis.

3. A method according to claim 2, wherein said angle is in the range of about 40° to about 50°.

4. A method according to claim 1, wherein there are three to six of said fins and three to six of said vents, each of said fins being arranged adjacent to a corresponding vent.

5. A method according to claim 1 further comprising a step of placing design indicia on at least one side of each of said fins for enhancing said visual effects.

6. A method according to claim 5, wherein said design indicia includes a reflective material for providing a visual flashing effect when said rotor body rotates in the presence of light.

7. A method according to claim 1 further comprising a step of placing on at least one side of each of said fins a reflective material for providing a visual flashing effect when said rotor body rotates in the presence of light.

8. A method assembly according to claim 1, wherein a head section of said rotor body is mounted on a distal end of said support member by a bearing element and a fastening element, wherein said fastening element passes through a wall of said head section and through said bearing element, and wherein a distal end of said fastening element is fixed to the distal end of said support member.

9. A method according to claim 1, wherein said rotor body is mounted on the distal end of said support member by a shaft element secured to and projecting inward from a head section of said rotor body, and wherein a distal end of said shaft element rests freely within a cup member secured to the distal endof said support member, such that said shaft and said rotor body are free to rotate relative to said cup member and said support member.

10. A method according to claim 1, wherein said barrel section wall is cylindrical and said fin shape is cut to form a fin having a concave surface and a convex surface on opposite sides of said fin, said convex surface being on a side of said fin toward which said rotor rotates in response to an air flow against said fin.

11. A method according to claim 1 further comprising a step of attaching a shakable noisemaker to an intermediate portion of said support member, said noisemaker being arranged to be shaken to produce noise in response to said rubbing of the neck section against the support member.

12. A method according to claim 1, wherein said wobble produces a beating action between the rotor neck and the support member that generates a bird repelling noise having a constantly changing rhythm or reverberation cycle.

13. A method according to claim 1 further comprising mounting an electrical sound device on said rotor body to provide the sound of a bird of prey or other bird predator, said sound device comprising a speaker for emitting said predator sound, and said speaker being mounted within a chamber of said rotor body so that said speaker is protected from weather and said predator sound passes freely out of said vent apertures.

14. A method according to claim 13, wherein said sound device further comprises a housing mounted on a head section of said rotor body and having an exterior wall for protecting electrical components of said sound device, and wherein said method further comprises mounting a solar cell on an exterior surface of said housing wall in a position to receive sunlight.

15. A method according to claim 14, further comprising mounting on said rotor body a battery to be charged by said solar cell and an electronic chip to be powered by said battery for generating a signal for causing said speaker to emit said predator sound.

16. A method of making a repeller assembly for repelling birds from a selected area, said method comprising steps of:
   selecting a hollow rotor body comprising a barrel section connected to a neck section having a mouth opening, said barrel section having a chamber surrounded by a sidewall of cuttable and deformable material and outwardly protruding hollow bosses spaced substantially equally apart around a periphery of said barrel section;

cutting said sidewall along cut lines to form at least two fin shapes each connected to said barrel section by a hinge portion, said cut lines being selected so that each of said fins includes at least a major portion of a corresponding one of said bosses;

pivoting said fin shapes radially outward from a rotational axis of said rotor body to deform said hinge portions and form at least two vent apertures in said rotor body and at least two fins each projecting outward from said rotor body and extending radially from said rotational axis;

selecting an elongated support member having a distal end portion and a proximate end portion adapted to be fixed within the selected area;

inserting said distal end portion of the support member into said barrel section through said mouth opening and said neck section; and, rotatably mounting said rotor body on said distal end portion, said vent apertures being arranged relative to said fins such that an air flow against said fins flows through said vents and causes rotation of said rotor body, said rotation generating a bird repelling sound.

17. A method according to claim 16, wherein said cut lines are made so that each of said fins includes substantially all of its corresponding boss.

18. A method according to claim 17, wherein each of said cut lines are made through an area of transition between a corresponding boss and an adjacent portion of said barrel wall so that said fins do not include substantially any of said adjacent barrel wall.

19. A method according to claim 16, wherein said hinge portions are deformed to position each of said fins such that an imaginary line tangent to an innermost surface of said hinge portion and to an outermost edge at a distal end of said fin is at an angle in the range of about 20° to about 90° relative to a radial of said rotational axis.

20. A method according to claim 16, wherein there are three to six of said fins and three to six of said vents, each of said fins being arranged adjacent to a corresponding vent.

21. A method of making a repeller assembly for repelling birds from a selected area, said method comprising steps of:

selecting a hollow rotor body comprising a head section and a barrel section connected to a neck section having a mouth opening, said barrel section being connected to said neck section by an acoustic section of said rotor body and having a chamber surrounded by a sidewall of cuttable and deformable material;

cutting said sidewall along cut lines to form at least two fin shapes each connected to said barrel section by a hinge portion;

pivoting said fin shapes radially outward from a rotational axis of said rotor body to deform said hinge portions and form at least two vent apertures in said rotor body and at least two fins each projecting outward from said rotor body and extending radially from said rotational axis;

selecting an elongated support member having a distal end portion and a proximate end portion adapted to be fixed within the selected area;

inserting said distal end portion of the support member into said barrel section through said mouth opening and said neck section; and, rotatably mounting said rotor body on said distal end portion, said vent apertures being arranged relative to said fins such that an air flow against said fins flows through said vents and causes rotation of said rotor body, said distal end portion passing through said neck section, said acoustic section and said barrel section such that said neck section rubs against said support member during rotor body rotation to produce a bird repelling sound that is amplified by said acoustic section.

22. A method according to claim 21, wherein the rotor body selected has outwardly protruding hollow bosses spaced substantially equally apart around a periphery of said barrel section of the rotor body, and wherein said cut lines are selected so that each of said fins includes at least a major portion of a corresponding one of said bosses.

23. A method according to claim 21, wherein said hinge portions are deformed to position each of said fins such that an imaginary line tangent to an innermost surface of said hinge portion and to an outermost edge at a distal end of said fin is at an angle in the range of about 20° to about 90° relative to a radial of said rotational axis.

24. A method according to claim 21, wherein an internal surface of said neck includes ridges that rub against said support member during rotor body rotation.

25. A method according to claim 21, wherein said barrel section wall is cylindrical and said fin shape is cut to form a fin having a concave surface and a convex surface on opposite side of said fin, said convex surface being on a side of said fin toward which said rotor rotates in response to an air flow against said fin.

26. A method according to claim 21, wherein said opening of the neck section and said distal end portion of the support member are sized to provide a clearance between an internal surface of said opening and an external surface of said distal end portion; and wherein said neck opening and mouinting means for rotatably mounting said rotor body are arranged so that air flowing against said fins and through said vents rotates said rotor with a wobble producing a rubbing action between the rotor neck and the support member that causes a vibratory sound having a constsntly changing rhythm or reverberation cycle for repelling birds from the selected area.

* * * * *